US008275825B2

(12) United States Patent  
Haugh et al.

(10) Patent No.: US 8,275,825 B2
(45) Date of Patent: Sep. 25, 2012

(54) THERMAL MANAGEMENT USING DISTRIBUTED COMPUTING SYSTEMS

(75) Inventors: Julianne F. Haugh, Austin, TX (US); Jeffrey B. Jennings, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/477,182

(22) Filed: Jun. 3, 2009

(65) Prior Publication Data

US 2010/0313204 A1 Dec. 9, 2010

(51) Int. Cl.
G06F 15/16 (2006.01)
G06F 15/173 (2006.01)

(52) U.S. Cl. ................... 709/201; 709/226; 709/229
(58) Field of Classification Search .......... 709/201, 709/226, 229
See application file for complete search history.

(56) References Cited

U.S. PATENT DOCUMENTS

| | | | | |
|---|---|---|---|---|
| 5,590,061 | A * | 12/1996 | Hollowell et al. | 702/130 |
| 6,718,390 | B1 * | 4/2004 | Still et al. | 709/229 |
| 7,421,623 | B2 | 9/2008 | Haugh | |
| 7,451,215 | B2 * | 11/2008 | Hawkinson et al. | 709/224 |
| 7,454,631 | B1 * | 11/2008 | Laudon et al. | 713/300 |
| 7,461,273 | B2 * | 12/2008 | Moore et al. | 713/300 |
| 7,596,476 | B2 * | 9/2009 | Rasmussen et al. | 703/2 |
| 7,783,909 | B2 * | 8/2010 | Hatasaki et al. | 713/324 |
| 2004/0044718 | A1 * | 3/2004 | Ferstl et al. | 709/200 |
| 2004/0264124 | A1 * | 12/2004 | Patel et al. | 361/686 |
| 2005/0278520 | A1 | 12/2005 | Hirai et al. | |
| 2006/0005097 | A1 | 1/2006 | Ichikawa et al. | |
| 2006/0010353 | A1 | 1/2006 | Haugh | |
| 2007/0174024 | A1 * | 7/2007 | Rasmussen et al. | 703/1 |
| 2007/0180117 | A1 * | 8/2007 | Matsumoto et al. | 709/226 |
| 2008/0162417 | A1 | 7/2008 | Morris et al. | |
| 2008/0215727 | A1 * | 9/2008 | Denis et al. | 709/224 |
| 2008/0303676 | A1 * | 12/2008 | Kettler et al. | 340/584 |
| 2009/0259345 | A1 * | 10/2009 | Kato et al. | 700/295 |
| 2010/0010688 | A1 * | 1/2010 | Hunter | 700/300 |
| 2010/0285828 | A1 * | 11/2010 | Panian et al. | 455/522 |

OTHER PUBLICATIONS

Wikipedia "Distributed Computing", www.wikipediaorg/Distributed_Computing, Mar. 20, 2009, pp. 1-9.

* cited by examiner

*Primary Examiner* — Minh-Chau Nguyen
(74) *Attorney, Agent, or Firm* — Cynthia G. Seal; Jeffrey L. Streets (57) ABSTRACT

One embodiment provides a computer-implemented method for enforcing a temperature limit of a client computer. The method includes receiving a request for computer-executable work to be executed on a client computer. If executing all of the requested work on the client computer would cause the client computer to exceed the temperature limit, a portion of the requested work may be selectively redirected to a remote computer in an amount selected to enforce the temperature limit of the client computer. Simultaneously, the remainder of the requested work may be executed on the client computer. The output of the redirected work may be communicated from the remote computer back to the client computer over a network.

20 Claims, 4 Drawing Sheets

THERMAL MANAGEMENT USING DISTRIBUTED COMPUTING SYSTEMS

BACKGROUND OF THE INVENTION

1. Field of the Invention

The present invention relates to thermal management of computer systems and to distributed computing systems.

2. Background of the Related Art

Electronic devices generate heat that must be removed to maintain safe operating temperatures. Thermal management is particularly challenging for portable electronic devices, like laptop computers, that have limited resources by virtue of their compact design. In particular, the power, processing capabilities, and cooling capacity of laptop computers is constrained. Laptop computers may be operated using a battery as the electrical source for a very limited duration per charge (i.e. "battery life"). The cooling system of a laptop is similarly constrained, such that a laptop can heat up considerably, which is especially noticeable when used in one's lap. At higher temperatures, a laptop cooling fan is forced to work harder, which further reduces the battery life. The higher temperatures can also make holding the laptop uncomfortable.

Various efforts have been made to improve the performance of laptop computers and other, battery-powered portable devices. For example, battery technology is continually under development, and newer technologies like lithium-ion battery technology provide enhanced battery life and lighter weight. Cooling system technology also continues to evolve, including the development of quieter and more efficient cooling fans. Power management resources are prevalent in portable devices as well, and include such features as screen savers, automatic hibernation modes, and other automated power-reduction measures.

BRIEF SUMMARY OF THE INVENTION

One embodiment of the present invention provides a computer-implemented method. A request is received for computer-executable work to be executed on a client computer. It is determined that executing all of the requested work on the client computer would cause the client computer to exceed a temperature limit selected for the client computer. A portion of the requested work is selectively redirected to a remote computer in an amount selected to enforce the temperature limit of the client computer, while simultaneously executing the remainder of the requested work on the client computer. The output of the redirected work is communicated from the remote computer back to the client computer over a network. The computer-implemented method may be performed by a computer executing computer-executable program code.

DETAILED DESCRIPTION OF THE INVENTION

One embodiment provides a computer-implemented method for reducing power consumption and enforcing a temperature limit of a client computer. The method includes receiving a request for computer-executable work to be executed by a client computer, and selectively redirecting a portion of the requested work to a remote computer in an amount selected to enforce a temperature limit of the client computer. The requested work may be parsed into tasks that may be executed on either of the client computer or the remote computer. The requested work may be completed by distributing the tasks between the client computer and the remote computer in a distribution that enforces the temperature limit on the client computer. For example, measurements of the client computer temperature may be used to selectively redirect some of the tasks to the remote computer. Alternatively, the predetermined workload and associated heat generation of various computer-executable tasks may be used to select a distribution of work effective to enforce the temperature limit. The remote computer has sufficient resources to easily execute the requested work, without regard to the heat generated remotely. By redirecting much of the requested work to the remote computer, the power consumption and heat generated at the client computer is reduced.

An example of a commercial embodiment would allow laptop users at an access point, such as wireless Internet access point at a coffee shop, to offload some of the workload from their laptop computers (the clients in this example) to a remotely located computer system, such as a remote server accessible over the Internet. The remote server may have sufficient capacity that the redirection of requested workload would be predominantly in one direction, from each laptop computer/client to the remote server having excess resources. The laptop computers would experience longer battery life and users could experience greater comfort and convenience, such as by decreasing the laptop operating temperatures and prolonging the laptop battery life, by offloading some of the workload to a remote computer.

Another example embodiment could be executed using a peer-to-peer networking architecture, allowing a plurality of equal "peer" nodes to alternately redirect requested workload. For example, a first laptop computer, temporarily acting as the client, could offload some requested workload to a second laptop computer in circumstances wherein the first laptop computer were approaching a temperature threshold and the second laptop computer has the extra capacity to receive some of the requested workload from the first laptop computer. At another point in time, the roles of the first and second laptop computers may be reversed, wherein the second laptop computer, temporarily acting as the client, could offload some requested workload to the first laptop computer to enforce a temperature threshold of the second laptop computer.

Figure 1:
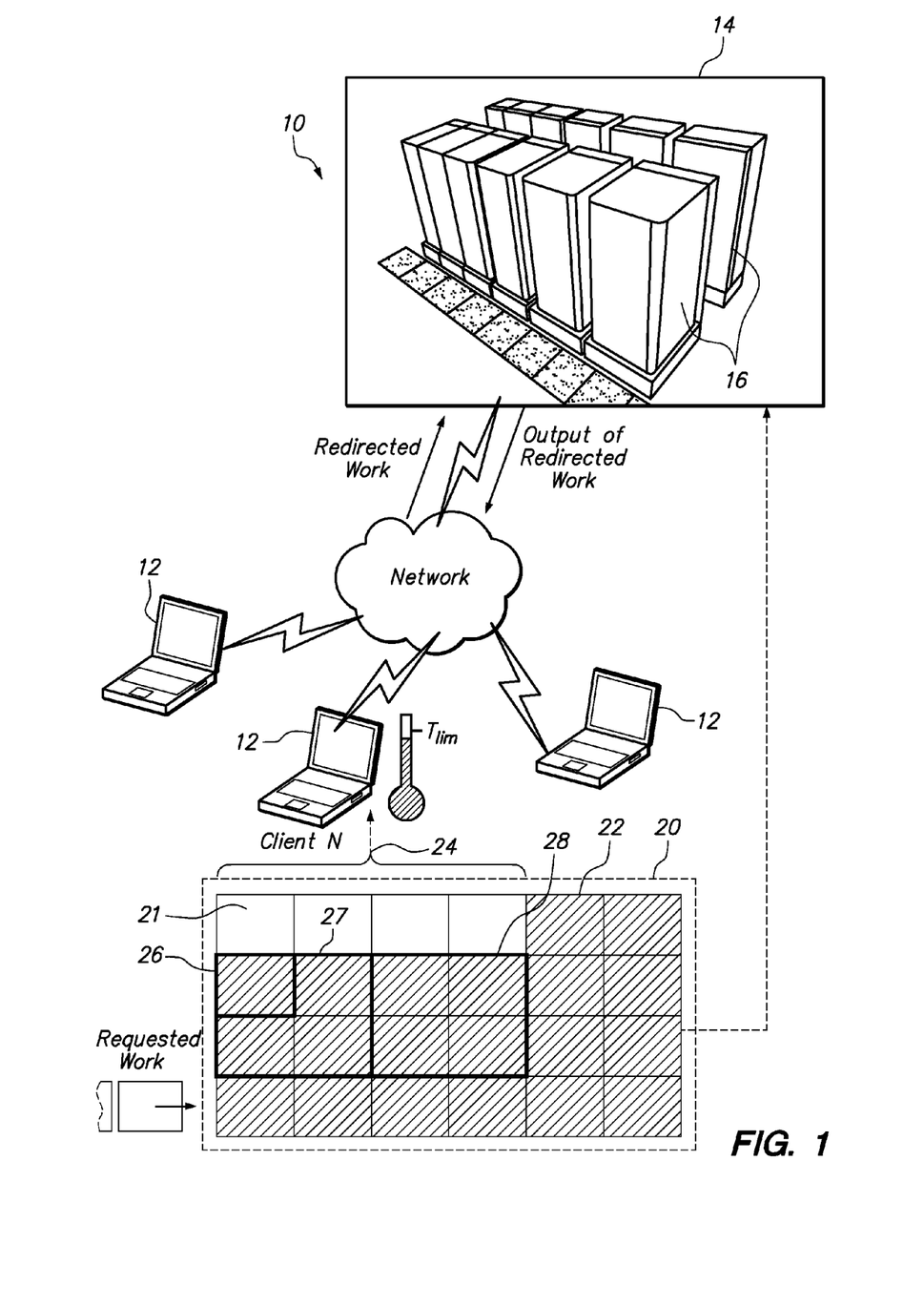
FIG. 1 is a schematic diagram of a networked computing system for selectively distributing computer-executable work according to an embodiment of the invention.

FIG. 1 is a diagram of a networked computing system 10 for selectively distributing computer-executable work according to an embodiment of the invention. The networked computing system 10 includes any number of client computers 12 connected over a network, e.g. a local area network (LAN) or the Internet, to a remote computer system 14. Each client computer 12 is physically separated from the remote computer system 14, and may be in a different geographical region of the world. Generally, a client computer and a remote computer according to an embodiment of the invention may be any two networked computer systems wherein the remote computer has the ability to execute some of the work requested of the client computer. By way of example, the networked computing system 10 is discussed in terms of a client-server architecture, wherein workload will be offloaded predominantly or entirely one-way, from any of the client computers 12 to the remote computer system 14, with the remote computer system 14 acting as a server having excess capacity for receiving and executing the requested work. However, it should be recognized that the networked computer system 10 may alternatively be implemented on a peer-to-peer architecture, wherein the client computer 12 and the remote computer system 14 may be regarded as equal peers having a reversible client-server relationship.

The client computers 12 in this embodiment are portable "laptop" computers, having limited processing power, cooling capacity, and power capacity when operating on battery power. The remote computer 14 is a datacenter with a number of equipment racks 16 having numerous rack-mounted servers and arranged in alternating hot-aisles and cold-aisles. Compared to laptop computers, a datacenter has tremendous processing power with a commensurate cooling capacity, and can be recruited to do the computer-executable work of many laptop computers. The comparatively large processing power and cooling capacity of the remote computer 14 is harnessed according to one aspect of this embodiment to offload excess workload from the client computer(s) 12 to the remote computer. Power consumption and heat generation are thereby minimized in the client computers 12.

One of the client computers 12 is referenced for purpose of discussion as "Client N." Client N is requested to execute computer-executable work, schematically shown at 20. The computer-executable work 20 may be "requested" by a user of Client N, by virtue of the user initiating and/or working with a software application. Each software application executes a number of independently-executable tasks. The requested work 20 may represent a snapshot of the tasks to be executed at a particular instant, with the software application dynamically generating tasks and executing the tasks during execution of the software application.

Each task may be governed by a defined segment of program code or a set of instructions. Different tasks may be executed according to different segments of program code. In some situations, different tasks may be executed according to the same defined segment of program code but using different input parameters, e.g., by applying the same defined segment of program code to different data sets. In one scenario, for example, the requested work 20 may entail the use of a spreadsheet application. Software tasks such as dynamically recomputing values in the spreadsheet may require considerable processing on an ongoing basis. This consumes energy and generates heat, which can elevate temperatures in Client N. To minimize energy consumption and heat generation, at least some of the requested work 20 may instead be redirected to the remote computer 14.

The requested work 20 from Client N is divided into workload units 21 that, for the purpose of illustration, are represented by squares of equal size. The workload units 21 may each correspond to an equal amount of energy consumed and heat generated (optionally stated as a rate; e.g., as power consumed and heat generated per unit time). The "workload" of a task included with the requested work 20 refers to a measure of the number of workload units 21 required to complete the task. The requested work 20 in this example is parsed into a group of tasks amounting to a combined workload of twenty-four workload units (represented by twenty-four squares). Different tasks will entail different workloads, as measured by a number of workload units 21. In a simplified example, a first task 26 requires a workload of one workload unit 21 to complete, a second task 27 requires a workload of three workload units 21 to complete, and a third task 28 requires a workload of four workload units 21 to complete. A relatively few number of workload units 21 are shown in the figure, for ease of illustration; in practice, the requested work 20 may entail a workload of any number of workload units 21, and a potentially very large number (e.g. thousands or millions) of workload units 21 to complete. The workload unit 21 may be expressed as a pure energy unit, such as Joules, a power unit, such as Joules per second, or a non-energy unit having a predictable correlation with energy consumption. The workload unit 21 may also be expressed in terms of a number of MIPS (millions of instructions per second). MIPS have a time-rate basis by definition, which can be factored out by alternatively expressing the workload unit 21 in terms of a number of "MIPS*seconds," which is equivalent to simply "millions of instructions."

To reduce the workload on Client N and manage the corresponding temperature of Client N, some of the work requested of Client N is selectively redirected to the remote computer 14, whose comparatively large power and cooling capacity allows the remote computer 14 to easily execute the work that was originally requested of Client N. A portion of the requested work 20 may be redirected to the remote computer 14 in a manner that distributes the workload units 21 between Client N and the remote computer 14, rather than executing all of the computer-executable work 20 on Client N. In this example, the majority (in the amount of twenty workload units) of the requested work 20 is redirected to the remote computer 14, while four workload units 21 remain on Client N, so that most of the power consumed and heat generated as a result of executing the requested work 20 occurs at the remote computer 14. The redirected work 22 is indicated by the shaded area in the figure. The remote computer 14 can simultaneously execute work redirected from many client computers 12. The remote computer 14 therefore serves as a virtual "heatsink" for the client computers 12, by taking on workload requested to be executed by the client computers 12. The output of the redirected work may then be communicated back to the client computers 12 over the Internet. For example, after the remote computer 14 re-computes values in a spreadsheet application, the re-computed values may be communicated back to Client N for display (visual output).

The requested work 20 is redirected from Client N to the remote computer 14 in a manner that enforces a temperature limit $T_{lim}$ selected for Client N. The temperature limit is less than the maximum operating temperature at which Client N is capable of reliably operating. The temperature limit may be selected, for example, to achieve a level of user comfort or to extend battery life (such as by reducing processor throughput and correspondingly limiting the fan speed required to cool the client computers 12). The remainder 24 of the requested work 20 not redirected to the remote computer 14 may be executed by Client N.

Client N is capable of executing all the requested work 20 when the remote computer 14 is not available to execute any of the requested work. One embodiment involves determining whether the remote computer 14 is available to execute some of the requested work and selectively redirecting the portion of the requested work to the remote computer 14 only when the remote computer 14 is determined to be available. Alternative measures to enforcing the temperature limit could be taken when the remote computer 14 is not available, such as by throttling the processors of Client N to enforce the temperature limit when the remote computer 14 is not available to execute the requested work.

It should be noted that the value of the temperature limit may be selected to be less than a maximum sustainable operating temperature of Client N. Thus, the temperature limit to be enforced may be appreciably less than a maximum operating temperature that Client N is capable of reliably maintaining. Also the value of the temperature limit may be variable, and be selected according to whether or not the remote computer 14 is available to execute some of the requested work. For example, one value of the temperature limit may be selected for enforcement when the remote computer 14 is not available, so that Client N is allowed to execute the requested work at a faster rate (at the expense of a higher operating temperature) when the remote computer 14 is not available. The value of the temperature limit may then be reduced in response to determining that the remote computer 14 is available to execute some of the requested work, since a portion of the requested work may then be redirected to the remote computer 14.

Figure 2:
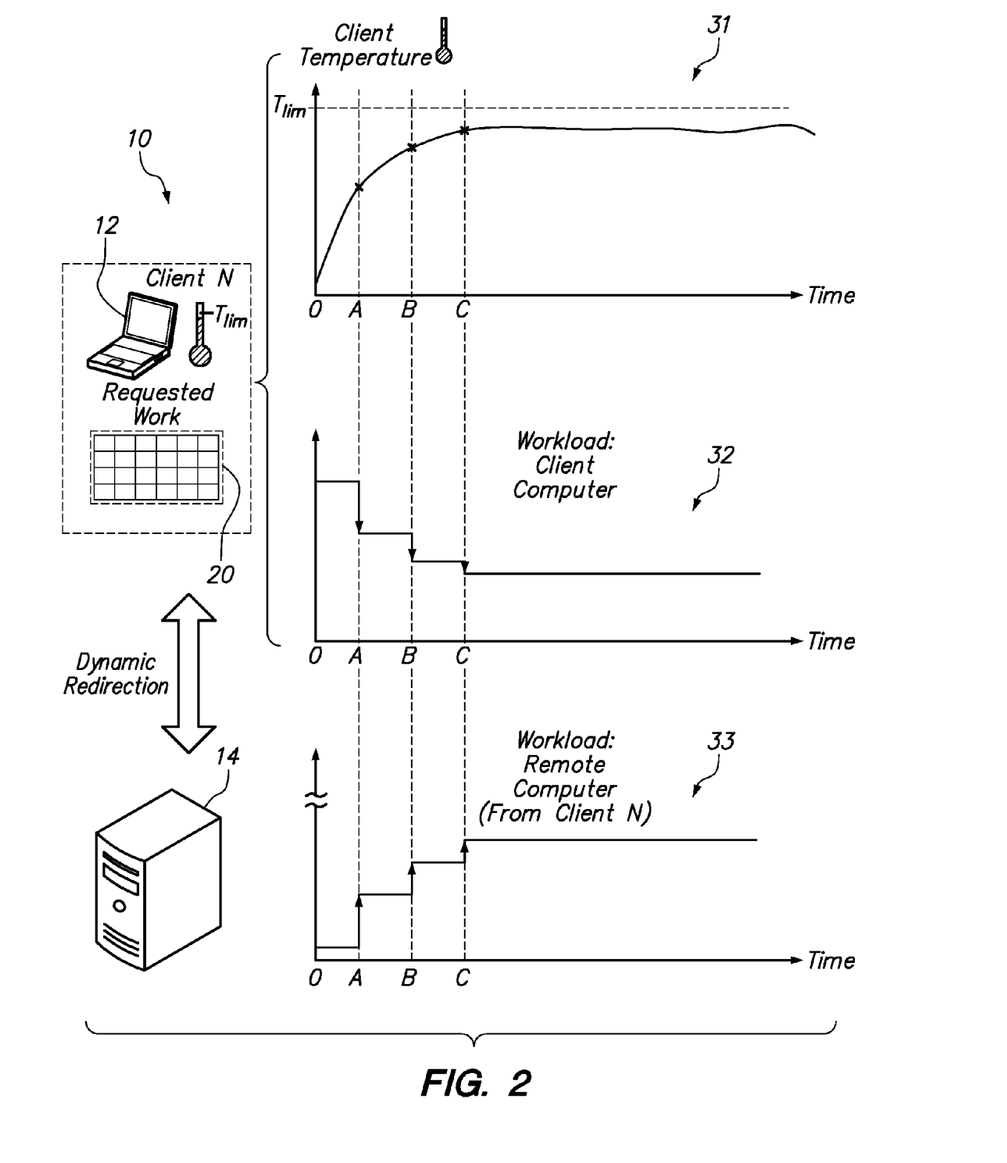
FIG. 2 is a schematic diagram illustrating a method of enforcing the temperature limit using temperature sensor feedback.

FIG. 2 is a schematic diagram illustrating the enforcement of the temperature limit $T_{lim}$ using temperature sensor measurements as feedback according to an embodiment of the invention. FIG. 2 continues with the example of the client computer 12 being the Client N laptop computer. The remote computer 14 is shown as a server, which may be one of the servers in the datacenter of FIG. 1 to which the requested work may be redirected from Client N. Three charts are shown—a first chart 31 plotting the temperature of Client N (i.e. "client temperature"), a second chart 32 plotting the workload on Client N over time, and a third chart 33 plotting the workload redirected from Client N to the remote computer 14. For purpose of discussion, the third chart 33 only shows the workload redirected from Client N, and does not reflect workload that may also be redirected from other client computers. The three charts 31-33 are aligned on the same timescale. The first chart 31 may be obtained by a temperature sensor within Client N, such as a thermocouple embedded in a processor of Client N. The sensed temperature is used as feedback in dynamically redirecting the requested work 20 between Client N and the remote computer 14. The workload on Client N (second chart 32) and the workload on the remote computer 14 (third chart 33) at a particular moment is indicative of the energy or power consumption and corresponding heat generation associated with the current distribution of the requested work between Client N and remote computer 14 at that moment.

Time "0" marks the moment that requested work begins to be executed. For example, Time 0 may be the moment that a software application is initiated, which may have an associated power consumption overhead even when the application is "idling" in the background. Alternatively, Time 0 may be the moment that a previously idling software application actually begins to execute requested work. The user may initiate the software application or Client N may automatically initiate the application, such as may be controlled by a scheduling application.

Three consecutive reference times A, B, and C following Time 0 are indicated. Immediately following Time 0, Client N may execute the requested work entirely on Client N. As shown in Chart 1, the temperature of Client N quickly rises in response to executing all of the requested work 20 on Client N. In response to the client temperature approaching the temperature limit (indicated by a dashed horizontal line), the networked computer system 10 dynamically redirects some of the requested work from Client N to the remote computer 14. This redirection of requested work is qualitatively indicated in the second chart 32 by a reduction of the workload on Client N and in the third chart 33 by a corresponding increase in the workload on the remote computer 14.

Between Times A and Time B, the client temperature continues to rise, although less rapidly than between Time 0 and Time A, and continues to approach the temperature limit. In response to continuing to approach the temperature limit at time A, Client N dynamically redirects a further portion of the requested work 20 from Client N to the remote computer 14. This is qualitatively indicated in the second chart 32 by a further reduction of the workload on Client N and in the third chart 33 by a corresponding further increase in the workload on the remote computer 14. An additional amount of the requested workload 20 is redirected from Client N to the remote computer 14 at Time C. After time C, the client temperature remains fairly constant, at less than the temperature limit, and no additional workload is redirected during the indicated time interval. The networked computer system 10 may continue to dynamically redirect the requested work 20, as necessary, to enforce the temperature limit $T_{lim}$.

Redirecting the requested work to the remote computer 14 may include redirecting a portion of the requested work currently being executed on Client N and/or redirecting a portion of the requested work awaiting execution on Client N. For example, if competing the tasks currently being executed on Client N would cause the temperature limit to be exceeded, then the tasks currently being executed on Client N may be cancelled on Client N and shifted to the remote computer 14. Alternatively, the tasks currently being executed on Client N may be completed if doing so will not cause the temperature limit to be exceeded.

One variation of this embodiment is to operate Client N at a reduced clock rate selected to enforce the temperature limit. One or more computer-executable instructions may be executed per clock cycle on the client computer at the reduced clock rate. The remaining instructions may be executed on the remote computer 14 instead of on Client N.

By virtue of dynamically redirecting the requested work 20, the requested work 20 is dynamically distributed between Client N and the remote computer 14. This is a more intelligent and controlled method of enforcing the temperature limit selected for Client N than to simply redirect all of the requested work 20 to the remote computer 14.

One reason for retaining some of the requested workload 20 at Client N is to control cost. A potential commercial implementation of the illustrated method is a service whereby users of client computers 12 pay for the convenience of offloading workload from their computers to the remote computer 14. For instance, a coffee shop or a third party may provide wireless connectivity for laptop computer users at the coffee shop. As part of this service, the requested work 20 may be redirected to the remote computer 14 to extend the battery life and minimize the temperatures of the laptop computers. The remote computer 14 may be a shared resource for many users, and each user may be charged a fee in relation to the volume of the workload offloaded to the remote computer 14 by virtue of redirecting the requested work 20. To minimize cost to each user and to maximize the number of client computers 12 that may be serviced by the remote computer 14, an acceptable approach is to redirect the requested work 20 in the smallest amount sufficient to effectively and reliably enforce the temperature limit.

Another reason for retaining some of the requested workload 20 at Client N is that it may not be possible or practical to redirect certain aspects of the requested workload 20, in which case only tasks that can be redirected are redirected. For example, the remote computer 14 may have a limited selection of program parts for executing only a limited set of tasks, and tasks that cannot be redirected may be retained on Client N. Furthermore, certain processing tasks, such a graphics or video processing, may be hardware-specific and may be left to the client computer.

Figure 3:
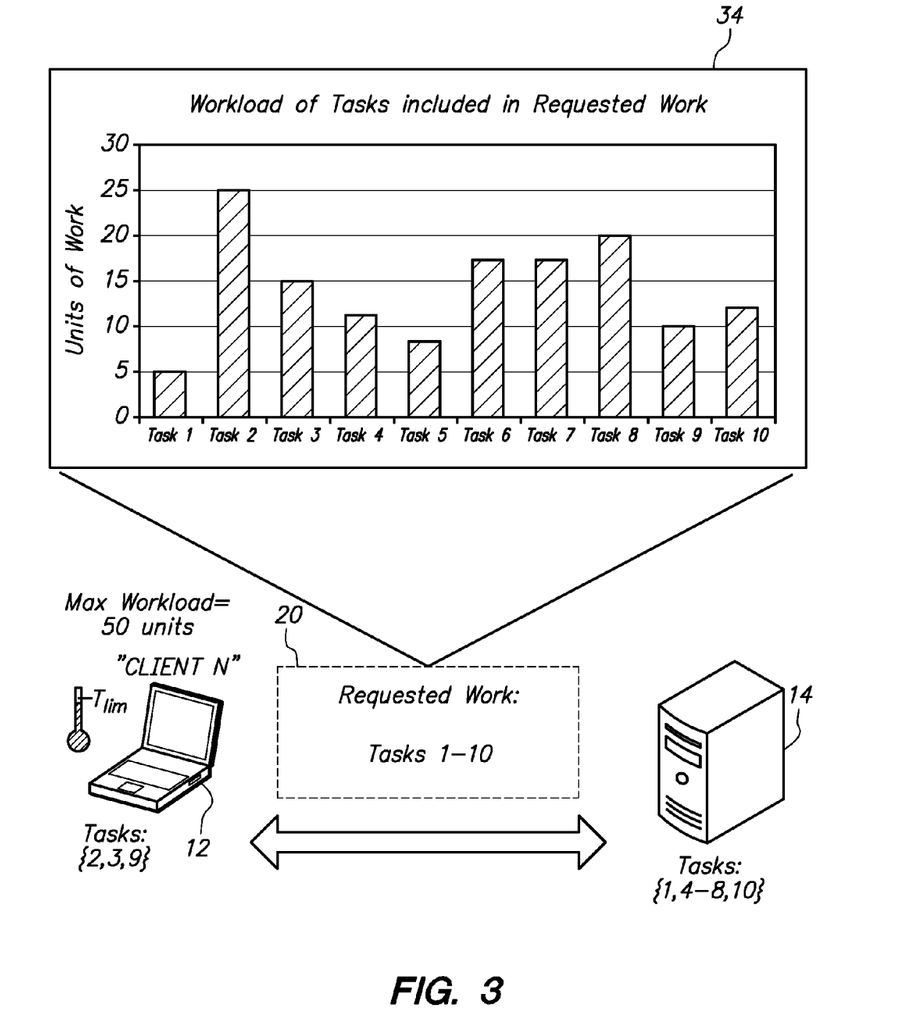
FIG. 3 is a schematic diagram illustrating an alternate method of enforcing the temperature limit wherein the requested work is redirected to the remote computer according to the workload and associated heat generation associated with various tasks.

FIG. 3 is a schematic diagram illustrating an alternate method of enforcing the temperature limit wherein the requested work 20 is redirected to the remote computer 14 according to the workload and associated heat generation associated with various tasks. This embodiment is particularly suited for use with software-controlled computer-executable tasks whose power consumption and corresponding heat production is well understood. In practice, the requested work may comprise many (e.g. thousands or millions) of computer-executable tasks, depending on the degree to which the requested work 20 is parsed. A simplified example is shown here, whereby the requested work 20 is parsed into ten computer-executable tasks, each of which may be executed by either Client N or the remote computer 14. The workload and corresponding heat production for each computer-executable task may be empirically predetermined. The empirically predetermined workload may be specific to a particular computer configuration, since different computers may consume a different workload and generate a different amount of heat as a result of executing an identical task. Thus, for example, the workload and corresponding heat production of a task may be predetermined for a laptop computer having a particular chipset and operating system. The predetermined workload for each task is indicated in a chart 34. The chart 34 provides a comparison of the workload (as an indicator of heat generation) of the various tasks comprising the requested work 20 at a particular instant in time.

A maximum workload may be selected for client computers 12 in an amount expected to enforce the respective temperature limits based on the predetermined workload of the tasks. A maximum workload of fifty workload units has been selected for Client N by way of example. Thus, limiting the workload on Client N to fifty workload units is expected to prevent a temperature of Client N from exceeding the temperature limit $T_{lim}$. The individual tasks comprising the requested work 20 may be selectively redirected to the remote computer 14 to dynamically distribute the workload among Client N and the remote computer 14, and to enforce the temperature limit. Tasks may be selectively executed on the client computer 12 such that the workload does not exceed fifty workload units at any given moment. For example, based on the predetermined workload for each of the tasks shown in the chart 34, the subset of Tasks 1, 3, and 9 are retained on Client N, totaling 25+15+10=50 workload units (the maximum workload for Client N). The remaining Tasks 1, 4-8, and 10 are redirected to the remote computer 14, which has excess power and cooling capacity to simultaneously execute the requested work redirected from Client N, as well as that of many other client computers 12. It should be noted that, in this embodiment, is it not necessary to measure and control the temperature, as temperature is instead controlled by virtue of being a function of the workload.

Figure 4:
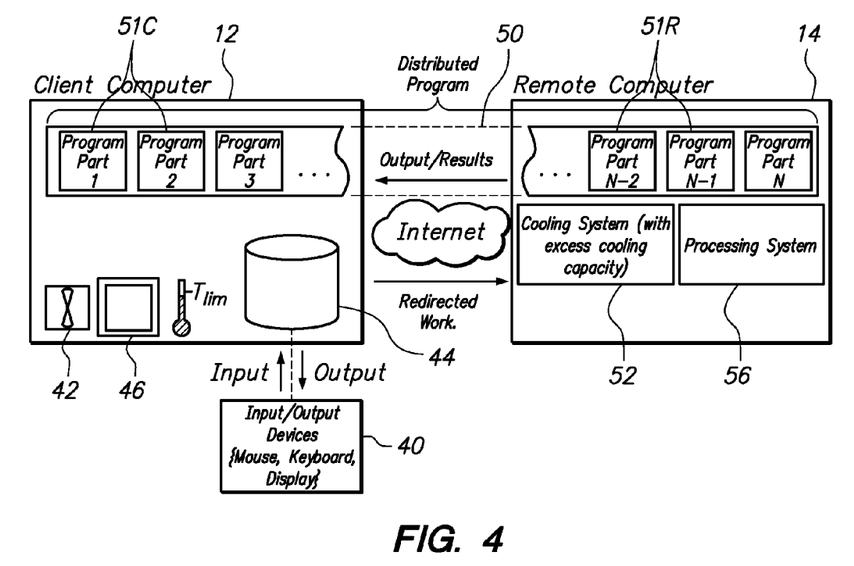
FIG. 4 is a schematic diagram of the networked computer system wherein a distributed program is used to distribute requested work between the client computer and the remote computer.

FIG. 4 is a schematic diagram of a networked computer system wherein a distributed program 50 is used to distribute requested work between the client computer 12 and the remote computer 14. Principles of distributed computing are known in the art. Generally, a distributed program is executed as multiple program parts running simultaneously on multiple computers communicating over a network. Various hardware and software architectures are known in the art for distributed computing, such as client-server, N-tier architecture, distributed objects, and so forth. Peer-to-peer networks may also be used, as further described below.

In this embodiment of the invention, the distributed program 50 comprises program parts 51C residing on the client computer 12 and program parts 51R residing on the remote computer 14. The program parts 51C, 51R are numbered from 1 to N, for reference. However, the program parts 51R include duplicates or equivalents of the particular program parts 51C required to execute the requested work, such that at least some of the tasks could be alternately executed by either the client computer 12 or the remote computer 14 but the client computer 12 is also able to function on its own when the remote computer 14 is not available. The workload is distributed among the program parts 51C, 51R in a manner that enforces the temperature limit $T_{lim}$ on the client computer 12.

The client computer 12 has one or more user input/output devices 40, a cooling system 42, a storage system 44, and a processor 46. The user input/output devices 40 may include a keyboard and a pointer device such as a mouse or trackball for interfacing with the client computer 12. The user input/output devices 40 may be used to request computer-executable work to be executed on the client computer 12, such as by initiating and interacting with the distributed program 50. The storage system 44 may include one or more long-term storage device, such as one or more hard discs or a flash-based memory that retains stored objects even when the client computer 12 is powered off. The stored objects on the long-term storage device typically include an operating system, the distributed program 50, and device drivers for the user input/output devices 40. The storage system 44 also typically includes system memory used when the client computer 12 is powered on. The system memory may include dual in-line memory modules (DIMMs), where computer-executable instructions loaded from the long-term storage device may be directly accessed and executed by the processor 46.

The remote computer 14 has a processing system 56 and a cooling system 52 having processing power and cooling capacity many times larger than the processing power and cooling capacity of the client computer 12. For example, the remote computer 14 may be a data center having the collective processing power of many (e.g. hundreds of) servers, and a powerful cooling system for cooling the many servers. The temperature limit on the client computer 12 is enforced by redirecting work requested of the client computer 12 to the remote computer 14. The requested work may be redirected by dividing the requested work among the program parts 51R on the remote computer 14 and the program parts 51C on the client computer 12 in a distribution that enforces the temperature limit on the client computer 12.

Alternatively, in the context of a peer-to-peer network architecture, the remote computer 14 may be only one of a plurality of remote computers, with each remote computer being a "peer" to each of the other remote computers and to the client computer 12. For example, the client computer 12 may be one laptop computer, and the remote computer 14 could represent one or more additional laptop computers, or a combination of other laptop computers and/or PCs. Each remote computer may include some of the program parts 51R. Each remote computer may include (but is not required to include) the same set of program parts 51R so that any subset of one or more of the remote computers may be capable of performing the requested work. The subset of remote computers (peers) selected to perform some of the requested work may be chosen according to factors such as the available capacity of each peer, which may vary from peer to peer at any given moment.

In one embodiment, temperature measurements at the client computer 12 are used as feedback to dynamically determine the amount and identify which portion(s) of the requested work to redirect to the remote computer 14 (see discussion of FIG. 2), and the requested work may be implemented according to the resulting workload distribution on both the client computer 12 and the remote computer 14 using the distributed program 50 of FIG. 4. In one specific example embodiment, the requested work may be initially executed on the client computer 12 using the program parts 51C. As the temperature of the client computer 12 increases and approaches the temperature limit, the requested work may be redirected to the remote computer 14 to shift the workload to the remote computer 14. The work redirected to the remote computer 14 may be executed according to the program parts 51R on the remote computer 14. In such an embodiment, a specific group of tasks may be started on the client computer 12, and the intermediate results may then be passed to the remote computer to complete the group of tasks and return the final results to the client computer 12.

In another embodiment, the workload associated with a number of computer-executable tasks may be predetermined (see discussion of FIG. 3), and the requested work is implemented using the distributed program 50 of FIG. 4 according to the workload and expected heat generation of individual tasks that comprise the requested work. As in the FIG. 4 embodiment, a maximum workload may be selected for client computer 12 in an amount predetermined to enforce the temperature limit of the client computer 12. The tasks may be distributed among the client computer 12 and the remote computer 14 such that the combined workload of the tasks on the client computer 12 does not exceed the maximum workload selected for the client computer 12. The tasks selected to be executed by the client computer 12 may be executed by selected component parts 51C on the client computer 14, and the tasks redirected to the remote computer 14 may be executed by selected program parts 51R on the remote computer 14.

In some cases, particular program parts 51C and/or 51R may be responsible for particular tasks, such that the particular program part 51C or 51R can be automatically selected on the basis of the task requested. A lookup table can be provided (not shown) that maps the particular task or type of task to the corresponding program part 51C or 51R responsible for that particular task or type of task. Again, at least some of the program parts 51C and 51R may be duplicates, such that a task currently being executed by a program part 51C on the client computer 12 could be redirected to a duplicate program part 51R on the remote computer 14.

In other cases, the client computer may execute all the tasks required for one application, and the remote computer may execute all tasks for a different application. For example, a spreadsheet application containing sensitive or confidential information could be retained on and executed by a laptop as the client computer, and a word processing application containing no sensitive or confidential information could be redirected to the remote computer. The spreadsheet application could be executed without exceeding the temperature limit, even though executing both of the spreadsheet and word processing applications on the client computer would otherwise cause the client computer to exceed the temperature limit.

Figure 5:
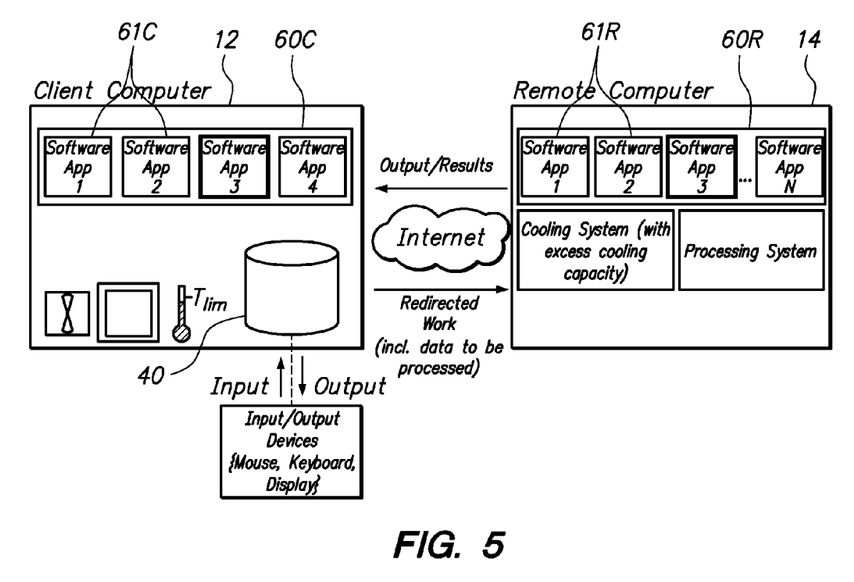
FIG. 5 is a schematic diagram of the networked computer system wherein the requested work is redistributed by communicating data to the remote computer for processing.

FIG. 5 is a schematic diagram of the networked computer system 10 wherein the requested work is redistributed by communicating data to the remote computer 14 for processing. The output of the processed data may then be communicated back to the client computer 12 over the Internet. Processing the data on the remote computer 14 reduces the workload on the client computer 12, and the data processing can be executed without the use of a distributed program described with reference to FIG. 4.

The client computer 12 has a number of software applications 61C in a software library 60C for a user to select. The remote computer 14 has a number of software applications 61R in a software library 60R, which include one or more duplicates or equivalents of the software applications 61C on the client computer 12. Unlike the distributed program 50 of the FIG. 2 embodiment, however, the applications 61C and 61R are regarded as separate applications, and not program parts of a distributed program. For example, the applications 61C on the client computer 12 may include separate word processing, spreadsheet, e-mail, and Internet browser applications. The applications 61R on the remote computer 14 may include one or more of the word processing, spreadsheet, e-mail, and Internet browser applications, or equivalent applications. The software library 60R may be provided with many commonly used applications to service a large user community, so that the requested application or its equivalent is likely to be available.

Work may be requested on the client computer 12, such as by a user or scheduling application initiating one or more of the applications 61C on the client computer 12. In response, the client computer 12 may interface with the remote computer 14 over the Internet to ascertain whether the appropriate software application 64 requested by a user or an equivalent thereof is available among the applications 61R on the remote computer 14. For example, the application generically identified as "Software App 3" may be found among the applications 61C on the client computer 12 and the applications 61R on the remote computer 14, as indicated by bold linetype. The duplicate or equivalent application 61R on the remote computer 14 may be opened, either in lieu of or in addition to opening the requested application 61C on the client computer 12. Then, data or other input to the application 61C may be communicated from the client computer 12 to the remote computer 14 so that data or other input may instead be processed by on the remote computer 14 using the duplicate or equivalent application 61R. The remote computer 14 may communicate the processed data back to the client computer 12 over the Internet.

In one example scenario, a user who desires to use a spreadsheet to execute numerous calculations may select a spreadsheet application on the client computer 12. The client computer 12 interfaces with the remote computer 14 over the Internet to determine if a duplicate or equivalent spreadsheet application is available on the remote computer 14. For example, the user may indicate a desire to open Microsft® Excel on the client computer 12. The client computer 12 interfaces with the remote computer 14 to determine the availability of a duplicate application, e.g. the identical version of Microsoft Excel, or an equivalent application, e.g. a different version of Microsoft Excel or a suitable alternative spreadsheet application like Lotus 1-2-3. If available, the duplicate or equivalent spreadsheet application is opened on the remote computer 14. The user enters spreadsheet data into the client computer 12 or requests the uploading of stored spreadsheet data. The spreadsheet data is communicated over the Internet to the remote computer 14, where the duplicate or equivalent spreadsheet application executes all (or at least a portion) of the data processing that otherwise would have been executed by the client computer 12.

In each of the embodiments described above, the user experience in interfacing with the client computer 12 will be substantially unaffected by redirecting some of the requested work to the remote computer 14. A graphical user interface (GUI) on the front-end display may appear as it would even if all of the requested work were executed on the client computer 12, even though some of the requested work has been redirected to the remote computer 14. The process or redirecting work may occur seamlessly, without diminishing or substantially affecting the output at the front end (e.g., at the GUI). However, the user may enjoy an improved user experience, by virtue of reduced operating temperature, increased battery life, and so forth at the client computer 12.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. The computer-usable program code embodied with the computer-usable medium may be communicated by a propagated data signal, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be executed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that execute the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally,"

"may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving a request for computer-executable work to be executed on a client computer;
   determining that executing all of the requested work on the client computer would cause the client computer to exceed a temperature limit selected for the client computer;
   selectively redirecting a portion of the requested work to a remote computer in an amount selected to enforce the temperature limit of the client computer, while simultaneously executing the remainder of the requested work on the client computer; and
   communicating the output of the redirected work from the remote computer back to the client computer over a network.

2. The computer-implemented method of claim 1, further comprising:
   determining whether the remote computer is available to execute some of the requested work; and
   selectively redirecting the portion of the requested work to the remote computer only when the remote computer is determined to be available.

3. The computer-implemented method of claim 2, further comprising throttling the processors of the client computer to enforce the temperature limit when the remote computer is not available to execute the requested work.

4. The computer-implemented method of claim 2, further comprising:
   reducing the temperature limit in response to determining that the remote computer is available to execute some of the requested work.

5. The computer-implemented method of claim 1, further comprising:
   determining a maximum number of workload units expected to enforce the temperature limit selected for the client computer based on predetermined association between workload and heat production for the client computer; and
   redirecting the portion of the requested work to the remote computer in response to the workload of the client computer approaching the maximum number of workload units.

6. The computer-implemented method of claim 1, wherein the step of selectively redirecting a portion of the requested work to a remote computer in an amount selected to enforce a temperature limit of the client computer comprises redirecting a portion of the requested work currently being executed on the client computer to the remote computer.

7. The computer-implemented method of claim 1, wherein the step of selectively redirecting a portion of the requested work to a remote computer in an amount selected to enforce a temperature limit of the client computer comprises redirecting a portion of the requested work awaiting execution on the client computer.

8. The computer-implemented method of claim 1, further comprising:
   predetermining the workload and corresponding heat production associated with each of a plurality of computer-executable tasks available for request as part of the computer-executable work; and
   selecting and executing a subset of tasks of the requested work on the client computer that, based on the corresponding heat production of the workload associated with the subset of tasks, the client computer is expected to execute without exceeding the temperature limit.

9. The computer-implemented method of claim 1, wherein the step of selectively redirecting a portion of the requested work to a remote computer comprises:
   parsing the requested work into a plurality of computer-executable tasks; and
   redirecting a subset of the tasks to the remote computer.

10. The computer-implemented method of claim 1, further comprising:
    operating the client computer at a reduced clock rate selected to enforce the temperature limit of the client computer;
    executing one or more instructions of the requested work per clock cycle on the client computer at the reduced clock rate; and
    simultaneously executing one or more other instructions of the requested work on the remote computer.

11. The computer-implemented method of claim 1, further comprising:
    providing a distributed software program with multiple program parts on the client computer and the remote computer; and
    distributing the requested work among the program parts of the program in a distribution that enforces the temperature limit on the client computer.

12. The computer-implemented method of claim 1, further comprising:
    receiving a request for a software application to execute the requested work;
    identifying a duplicate or equivalent software application on the remote computer; and
    executing at least some of the requested work on the duplicate or equivalent software application on the remote computer.

13. The computer-implemented method of claim 1, further comprising:
    identifying that the requested work includes the request to process data capable of being processed by a software application residing on the remote computer;
    communicating the data requested to be processed from the client computer to the remote computer;
    processing the communicated data on the remote computer instead of processing the data on the client computer; and
    transferring the output of the processed data from the remote computer back to the client computer over the network.

14. A computer program product including computer usable program code embodied on a non-transitory computer usable storage medium for enforcing a temperature limit on a client computer, the computer program product including:
- computer usable program code for receiving a request for computer-executable work to be executed on a client computer;
- computer usable program code for determining that executing all of the requested work on the client computer would cause the client computer to exceed a temperature limit selected for the client computer;
- computer usable program code for selectively redirecting a portion of the requested work to a remote computer in an amount selected to enforce the temperature limit of the client computer, while simultaneously executing the remainder of the requested work on the client computer; and
- computer usable program code for communicating the output of the redirected work from the remote computer back to the client computer over a network.

15. The computer program product of claim 14, further comprising:
- computer usable program code for determining whether the remote computer is available to execute some of the requested work; and
- computer usable program code for selectively redirecting the portion of the requested work to the remote computer only when the remote computer is determined to be available.

16. The computer program product of claim 15, further comprising computer usable program code for reducing the temperature limit in response to determining that the remote computer is available to execute some of the requested work.

17. The computer program product of claim 14, further comprising:
- computer usable program code for determining a maximum number of workload units expected to enforce the temperature limit selected for the client computer based on predetermined association between workload and heat production for the client computer; and
- computer usable program code for redirecting the portion of the requested work to the remote computer in response to the workload of the client computer approaching the maximum number of workload units.

18. The computer program product of claim 14, further comprising computer usable program code for distributing the requested work among program parts of a distributed program on the client computer and remote computer in an amount that enforces the temperature limit on the client computer.

19. The computer program product of claim 14, further comprising:
- computer usable program code for receiving a request for a software application to execute the requested work;
- computer usable program code for identifying a duplicate or equivalent software application on the remote computer; and
- computer usable program code for executing at least some of the requested work on the duplicate or equivalent software application on the remote computer.

20. The computer program product of claim 14, further comprising:
- computer usable program code for identifying that the requested work includes the request to process data capable of being processed by a software application residing on the remote computer;
- computer usable program code for communicating the data requested to be processed from the client computer to the remote computer;
- computer usable program code for processing the communicated data on the remote computer instead of processing the data on the client computer; and
- computer usable program code for transferring the output of the processed data from the remote computer back to the client computer over the network.

* * * * *